US012664378B2

(12) United States Patent
I et al.

(10) Patent No.: US 12,664,378 B2
(45) Date of Patent: Jun. 23, 2026

(54) GENERATING SUBSET(S) OF CANDIDATE LANGUAGES FOR TRANSLATION APPLICATION(S)

(71) Applicant: GOOGLE LLC, Mountain View, CA (US)

(72) Inventors: Te I, San Jose, CA (US); Chris Kau, Los Altos, CA (US); Jeffrey Robert Pitman, Santa Clara, CA (US); Qi Ge, Fremont, CA (US)

(73) Assignee: Google LLC, Mountain View, CA (US)

( * ) Notice: Subject to any disclaimer, the term of this patent is extended or adjusted under 35 U.S.C. 154(b) by 98 days.

(21) Appl. No.: 18/419,171

(22) Filed: Jan. 22, 2024

(65) Prior Publication Data

US 2025/0238639 A1    Jul. 24, 2025

(51) Int. Cl.
*G06F 3/0482* (2013.01)
*G06F 3/16* (2006.01)
*G06F 40/58* (2020.01)
*G10L 15/00* (2013.01)

(52) U.S. Cl.
CPC ............ *G06F 40/58* (2020.01); *G06F 3/0482* (2013.01); *G06F 3/167* (2013.01); *G10L 15/005* (2013.01)

(58) Field of Classification Search
CPC .......... G06F 40/58; G06F 3/0482; G06F 3/16; G10L 15/00
See application file for complete search history.

(56) References Cited

U.S. PATENT DOCUMENTS

| | | | | |
|---|---|---|---|---|
| 6,161,082 A | * | 12/2000 | Goldberg .............. | H04L 51/063 709/204 |
| 6,266,642 B1 | * | 7/2001 | Franz .................... | G06F 40/211 704/277 |
| 11,966,713 B1 | * | 4/2024 | Allocco .................. | G06F 40/58 |
| 12,299,409 B1 | * | 5/2025 | Allocco ................. | G06Q 50/10 |
| 2008/0021697 A1 | * | 1/2008 | Cox ...................... | H04W 4/029 704/2 |
| 2010/0161311 A1 | * | 6/2010 | Massuh ............... | G06F 16/9537 704/7 |
| 2010/0299150 A1 | * | 11/2010 | Fein ........................ | G06F 40/58 704/277 |
| 2014/0229155 A1 | * | 8/2014 | Leydon ............... | G06F 16/3337 704/2 |
| 2015/0051898 A1 | * | 2/2015 | Cuthbert ............... | G06F 40/263 704/3 |

(Continued)

*Primary Examiner* — Anil K Bhargava
(74) *Attorney, Agent, or Firm* — Gray Ice Higdon

(57) ABSTRACT

Various implementations include initiating, at a client device, a translation application for translation of a dialog session between a first user speaking in a first language and a second user speaking in a second language. In many implementations, the first language, spoken by the first user, can be determined based on one or more features of the client device. Additional or alternative implementations include determining a subset of candidate second languages from a plurality of languages available to the translation application. In a variety of implementations, the system can render output based on the subset of candidate second languages, and can process received input from the second user indicative of one or more of the candidate second languages in the subset of candidate second languages.

21 Claims, 8 Drawing Sheets

200

<TEXT IN FIRST CANDIDATE LANGUAGE PROMPTING THE SECOND USER TO SELECT THE FIRST LANGUAGE> 202

<TEXT IN SECOND CANDIDATE LANGUAGE PROMPTING THE SECOND USER TO SELECT THE SECOND LANGUAGE> 204

⋮

<TEXT IN NTH CANDIDATE LANGUAGE PROMPTING THE SECOND USER TO SELECT THE NTH LANGUAGE> 206

(56) References Cited

U.S. PATENT DOCUMENTS

| | | | | |
|---|---|---|---|---|
| 2015/0350451 A1* | 12/2015 | Aue | ........................ | G06F 40/58 |
| | | | | 379/202.01 |
| 2019/0171718 A1* | 6/2019 | Ishikawa | ................. | G06F 40/58 |
| 2019/0318735 A1* | 10/2019 | Chao | ........................ | G10L 15/14 |
| 2021/0390268 A1* | 12/2021 | Pandey | .................. | G06N 5/025 |
| 2022/0301036 A1* | 9/2022 | Tseretopoulos | ....... | G06F 16/951 |
| 2023/0419958 A1* | 12/2023 | Neelagiri | .............. | G10L 15/197 |
| 2025/0225338 A1* | 7/2025 | Lauder | ................... | G06F 40/40 |

* cited by examiner

<TEXT IN FIRST CANDIDATE LANGUAGE PROMPTING THE SECOND USER TO SELECT THE FIRST LANGUAGE> 202

<TEXT IN SECOND CANDIDATE LANGUAGE PROMPTING THE SECOND USER TO SELECT THE SECOND LANGUAGE> 204

⋮

<TEXT IN NTH CANDIDATE LANGUAGE PROMPTING THE SECOND USER TO SELECT THE NTH LANGUAGE> 206

300

<TEXT IN FIRST CANDIDATE LANGUAGE PROMPTING THE SECOND USER TO SPEAK A FIRST UTTERANCE IN THE FIRST LANGUAGE> 302

<TEXT IN SECOND CANDIDATE LANGUAGE PROMPTING THE SECOND USER TO SPEAK A SECOND UTTERANCE IN THE SECOND LANGUAGE> 304

⋮

<TEXT IN NTH CANDIDATE LANGUAGE PROMPTING THE SECOND USER TO SPEAK A NTH UTTERANCE IN THE NTH LANGUAGE> 306

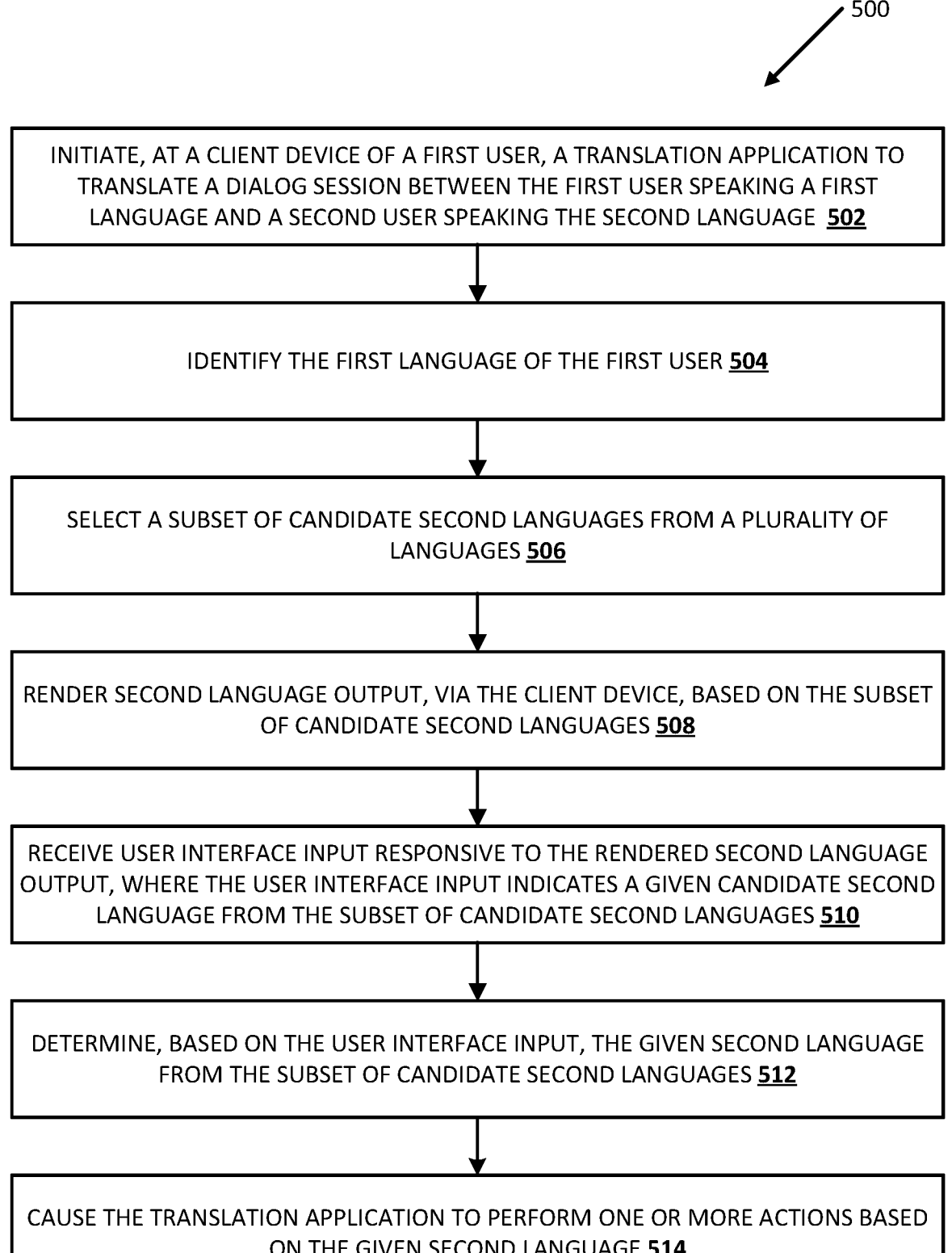

INITIATE, AT A CLIENT DEVICE OF A FIRST USER, A TRANSLATION APPLICATION TO TRANSLATE A DIALOG SESSION BETWEEN THE FIRST USER SPEAKING A FIRST LANGUAGE AND A SECOND USER SPEAKING THE SECOND LANGUAGE 502

IDENTIFY THE FIRST LANGUAGE OF THE FIRST USER 504

SELECT A SUBSET OF CANDIDATE SECOND LANGUAGES FROM A PLURALITY OF LANGUAGES 506

RENDER SECOND LANGUAGE OUTPUT, VIA THE CLIENT DEVICE, BASED ON THE SUBSET OF CANDIDATE SECOND LANGUAGES 508

RECEIVE USER INTERFACE INPUT RESPONSIVE TO THE RENDERED SECOND LANGUAGE OUTPUT, WHERE THE USER INTERFACE INPUT INDICATES A GIVEN CANDIDATE SECOND LANGUAGE FROM THE SUBSET OF CANDIDATE SECOND LANGUAGES 510

DETERMINE, BASED ON THE USER INTERFACE INPUT, THE GIVEN SECOND LANGUAGE FROM THE SUBSET OF CANDIDATE SECOND LANGUAGES 512

CAUSE THE TRANSLATION APPLICATION TO PERFORM ONE OR MORE ACTIONS BASED ON THE GIVEN SECOND LANGUAGE 514

FIG. 5

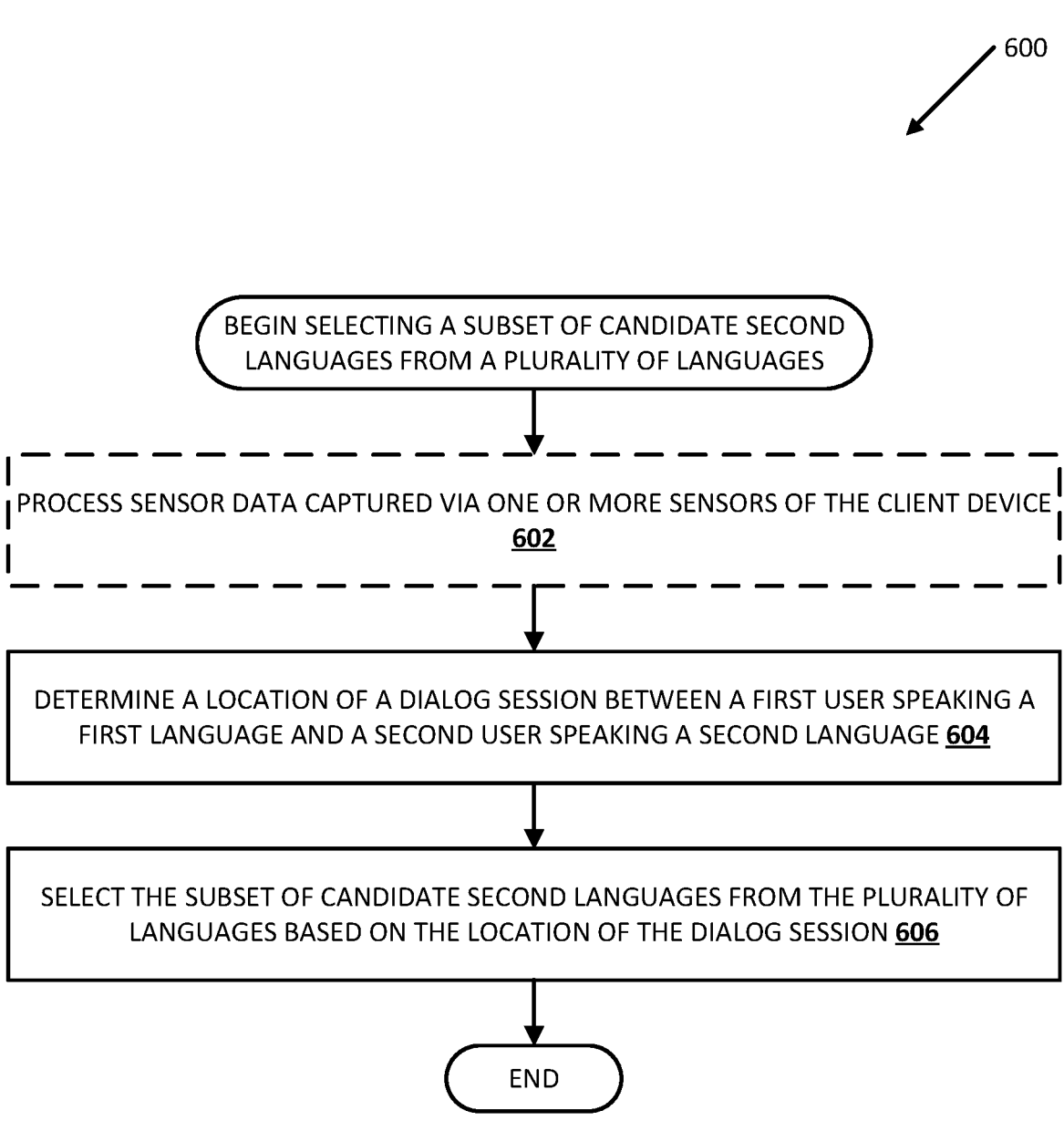

600

BEGIN SELECTING A SUBSET OF CANDIDATE SECOND LANGUAGES FROM A PLURALITY OF LANGUAGES

PROCESS SENSOR DATA CAPTURED VIA ONE OR MORE SENSORS OF THE CLIENT DEVICE 602

DETERMINE A LOCATION OF A DIALOG SESSION BETWEEN A FIRST USER SPEAKING A FIRST LANGUAGE AND A SECOND USER SPEAKING A SECOND LANGUAGE 604

SELECT THE SUBSET OF CANDIDATE SECOND LANGUAGES FROM THE PLURALITY OF LANGUAGES BASED ON THE LOCATION OF THE DIALOG SESSION 606

END

GENERATING SUBSET(S) OF CANDIDATE LANGUAGES FOR TRANSLATION APPLICATION(S)

BACKGROUND

Translation applications can translate a dialog session between users speaking in different languages. Existing translation applications require the user(s) to scroll through all available languages indiscriminately to select language(s) spoken in the dialog session, which is very time consuming. Additionally, it is resource intensive for a translation application to run multiple language identification (langID) models.

For example, a translation application can process audio data capturing Steve speaking in English, where Steve is having a conversation with Ginger who speaks German. For instance, the translation application can process the audio data using an English automatic speech recognition (ASR) model to generate a text representation of Steve's speech. Additionally, the translation application can process the text representation of Steve's speech in English using a German translation model to generate a text representation of Steve's speech in German. The translation application can then generate German audio data which includes synthetic speech of the German translation of Steve's speech. Similarly, the translation application can process audio data capturing Ginger speaking in German, can generate a text representation of Ginger's speech by processing the audio data using a German ASR model, can translate the text representation into English text, and can generate audio data which includes synthetic speech of the English translation of Ginger's speech. The translation application can continue translating audio data capturing Steve's speech and/or Ginger's speech for one or more additional turns in the dialog session.

SUMMARY

Techniques described herein are directed towards translating a dialog session between a first user speaking a first language and a second user speaking a second language. More particularly, some techniques are directed to enabling more efficient and/or more accurate selection of the second language, that the second user is speaking, for use in translating the dialog session. In some implementations, the system can generate, from a superset of candidate second languages, a subset of candidate second languages (e.g., a subset of candidate second languages potentially spoken by the second user) for rendering at the translation application, where only the subset of the candidate second languages are rendered. A selection of one of the rendered candidate second languages of the subset can then be made (e.g., by the first user or the second user) and, responsive to the selection, the selected one can be utilized as a target language for translating of the dialog session. Generating and rendering only the subset of the candidate second languages can reduce the quantity of inputs needed for selecting the true second language being spoken by the second user and/or can mitigate occurrences of selecting an incorrect second language. Mitigating occurrences of selecting an incorrect second language can prevent erroneous and computationally wasteful attempts at translating to and/or from an incorrect second language.

As an example, while visiting Delhi, India, Caleb can initiate a translation application on his mobile phone to have a conversation with the owner of Hypothetical Café. The system can identify the first language, spoken by Caleb (i.e., the first user), based on one or more features of his mobile phone (i.e., the client device). For example, the system can identify the default language selected by Caleb while setting up his mobile phone as the first language spoken by Caleb. Additionally or alternatively, the system can determine the mobile phone is currently located in Delhi, India, and utilize such a determination in identifying a subset of candidate second languages for the owner of Hypothetical Café. For example, the system can identify the mobile phone's location based on sensor data captured via one or more positioning sensors (e.g., GPS) of the mobile phone. In some implementations, the system can select a subset of candidate second languages, which may be spoken by the owner of Hypothetical Café, based on the location Delhi, India. For example, the system can identify the subset of candidate second languages of Hindi, Punjabi, Bengali, and Urdu as candidate second languages spoken in Delhi, India.

Output, based on the subset of candidate second languages, can be rendered via Caleb's mobile phone (i.e., the client device of the first user). For instance, graphical user interface output can be rendered via the display of the mobile phone, where the output includes a first selectable button which includes text written in Hindi prompting the second user (i.e., the owner of Hypothetical Café) to select the button if they speak Hindi, a second selectable button which includes text written in Punjabi prompting the second user to select the button if they speak Punjabi, a third selectable button which includes text written in Bengali prompting the second user to select the button if they speak Bengali, and a fourth selectable button which includes text written in Urdu prompting the second user to select the button if they speak Urdu. The owner of Hypothetical Café can provide input, to Caleb's mobile phone, selecting language they speak, such as selecting the selectable button corresponding to one of the candidate second languages in the subset of candidate second languages. The selected language can then be used as the second language in the translation performed via the translation application.

Additionally or alternatively, the output rendered via the client device of the first user (e.g., Caleb's mobile phone) can include graphical user interface output rendered via the display of the client device, where the output, in each of the candidate second languages, prompts the second user to speak a phrase to indicate they speak the candidate second languages. Similarly, the system can render audio output, in each of the candidate second languages, prompting the second user to speak a phrase to indicate they speak the candidate second language.

In some implementations, the system can process audio data using one or more language identification (langID) models to generate langID output indicating the language that is spoken in an utterance captured in the audio data. The audio data captures the utterance that is spoken by the second user in response to rendering such graphical user interface output and/or audio output (e.g., that prompts the second user to speak a phrase). For instance, the system can process audio data capturing an utterance spoken by the owner of Hypothetical Cafe responsive to output rendered via Caleb's mobile phone, where the output rendered via Caleb's mobile phone is based on the subset of candidate second languages of Hindi, Punjabi, Bengali and Urdu.

Some langID models are trained to identify a particular language (e.g., output of the langID model indicates whether the speaker is speaking in German). Additional or alternative langID models are trained to identify multiple languages (e.g., output of the langID model indicates whether the speaker is speaking German, English, French, or Spanish). Processing the audio data (capturing the utterance spoken by the second user) using one or more langID models for every possible language available to the translation application is very computationally expensive (e.g., processor cycles, memory, battery, power, etc.). For example, narrowing the subset of candidate second languages spoken by the owner of Hypothetical Cafe to Hindi, Punjabi, Bengali and Urdu, the computing resources required for initiating the translation application are reduced.

For example, the system can process audio data spoken by the owner of Hypothetical Cafe using a Hindi langID model to generate Hindi langID output; using a Punjabi langID model to generate Punjabi langID output; using a Bengali langID model to generate Bengali langID output; and using a Urdu langID model to generate Urdu langID output. Additionally or alternatively, the system can process the audio data spoken by the owner of Hypothetical Cafe using one or more additional or alternative langID models (e.g., using a multilingual langID model which can generate output indicating whether the audio data includes an utterance spoken in Hindi, Punjabi, Bengali, or Urdu; using a first langID model which generates output indicating whether the audio data includes an utterance spoken in Hindi or Urdu and a second langID model which generates output indicating whether the audio data includes an utterance spoken in Punjabi or Bengali; using one or more additional or alternative langID models which can generate output indicating whether the audio data includes an utterance spoken in one or more of the candidate second languages, and/or combinations thereof).

Accordingly, implementations described herein are directed to narrowing a plurality of languages available to a translation application to a smaller subset of candidate languages, where each candidate language, in the subset of candidate languages, may be one that is actually spoken by the second user. In contrast, manually entering one or more languages for a translation application requires multiple inputs and a prolonged duration of time. For example, when manually entering language(s), a user must manually browse a large quantity of candidate languages and select one or more anticipated languages spoken by the second user. Additionally or alternatively, manual selection of the one or more languages can lead to erroneous language selection, leading to failure of translation and, further, leading to additional resource utilization for translation, which results in additional processing of additional audio data for additional utterances, with the new language being manually selected in an attempt at successful translation.

Processing the audio data (capturing the utterance spoken by the second) using one or more langID models for every possible language available to the translation application is very computationally expensive (e.g., processor cycles, memory, battery, power). Additionally or alternatively, a langID model trained to differentiate between a larger number of languages can provide less accurate language identification output compared to a langID model trained to differentiate between a smaller number of languages. Narrowing a plurality of languages available to a translation application to a smaller subset of candidate languages in accordance with some implementations described herein reduces computing resources required for initiating the translation application and/or increases the accuracy of language identification.

As used herein, a "dialog" may include a logically-self-contained exchange between a user and automated assistant (and in some cases, other human participants). The automated assistant may differentiate between multiple dialogs with the user based on various signals, such as passage of time between dialogs, change of user context (e.g., location, before/during/after a scheduled meeting, etc.) between dialogs, detection of one or more intervening interactions between the user and the client device other than dialogs between the user and the automated assistant (e.g., the user switches applications for a while, the user walks away from then later returns to a standalone voice-activated product), locking/sleeping of the client device between dialogs, change of client devices used to interface with the automated assistant, and so forth. As used herein, a "turn" of a dialog may include an input provided by a user during a dialog. In some implementations, the turn of the dialog may be limited to the input provided by the user, whereas in other implementations, the turn of the dialog may include a prior response provided by the automated assistant to which the input provided by the user is responsive and/or a subsequent response provided by the automated assistant that is responsive to the input provided by the user.

The above description is provided as an overview of only some implementations disclosed herein. Those implementations, and other implementations, are described in additional detail herein. Further, it should be understood that techniques disclosed herein can be implemented locally on a client device, remotely by server(s) connected to the client device via one or more networks, and/or both.

BRIEF DESCRIPTION OF THE DRAWINGS

FIG. 5 depicts a flowchart illustrating an example process of initiating a translation application to translate a dialog session between a first user speaking a first language and a second user speaking a second language, in accordance with various implementations.

FIG. 6 depicts a flowchart illustrating an example process of selecting a subset of candidate second languages from a plurality of languages, in accordance with various implementations.

DETAILED DESCRIPTION

Figure 1:
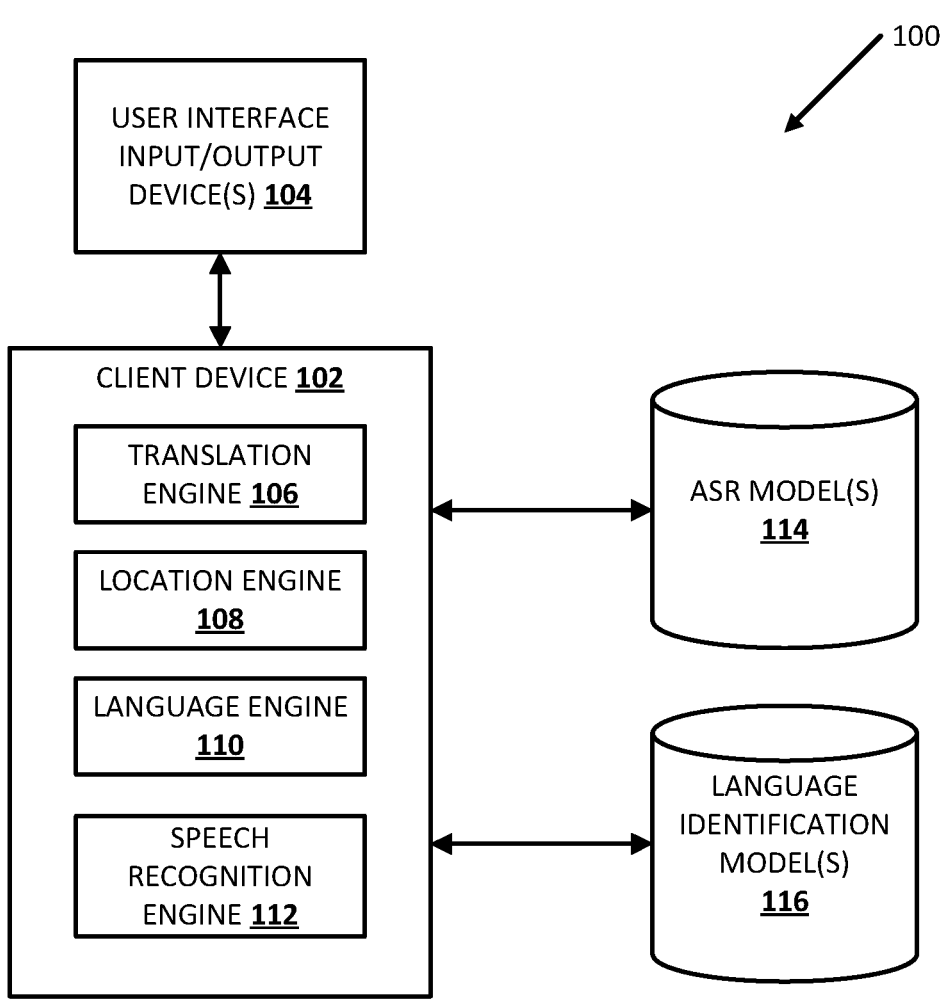
FIG. 1 depicts a block diagram of an example environment in which implementations disclosed herein can be implemented.

Turning now to FIG. 1, a block diagram of an example environment 100 that demonstrates various aspects of the present disclosure, and in which implementations disclosed herein can be implemented is depicted. The example environment 100 includes a client device 102, user interface input/output device(s) 104, and/or one or more additional or alternative components. The client device 102 includes translation engine 106, location engine 108, language engine 110, speech recognition engine 112, one or more additional or alternative engines (not depicted), and/or combinations thereof. Additionally or alternatively, the client device 102 may be associated with ASR model(s) 114, language identification model(s) 116, one or more additional or alternative components, and/or combinations thereof. In some of these implementations, the client device 102 and/or additional or alternative components may be communicatively coupled with each other via one or more networks, such as one or more wired or wireless local area networks ("LANs," including Wi-Fi LANs, mesh networks, Bluetooth, near-field communication, etc.) or wide area networks ("WANs", including the Internet).

In some implementations, the client device 102 may include one or more user interface input/output devices 104, which may include, for example, a physical keyboard, a touch screen (e.g., implementing a virtual keyboard or other textual input mechanisms), a microphone, a camera, a display screen, and/or speaker(s). The user interface input/output device(s) 104 may be incorporated with one or more client device 102 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of client device 102 may be implemented on a computing system that also contains the user interface input/output devices.

Some non-limiting examples of client device 102 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Client device 102 may include one or more memories for storage of data and software applications, one or more processors for accessing data and executing applications, and other components that facilitate communication over a network. The operations performed by client device 102 may be distributed across multiple computing devices. For example, computing programs running on one or more computers in one or more locations can be coupled to each other through a network.

In some implementations, translation engine 106 can initialize a translation application at the client device. Additionally or alternatively, the translation engine 106 can translate a dialog session between a first user speaking a first language and a second user speaking a second language. In some implementations, location engine 108 can be used to determine the location of the dialog session and/or of client device 102. For example, the system can determine the location of the dialog session in accordance with block 604 of FIG. 6 described herein.

Language engine 110 can determine one or more languages for the translation application. In some implementations, the system can determine the language of the first user (e.g., the owner of the client device who is initiating the translation application) based on one or more features of client device 102 (e.g., based on a primary language selected by the user during initialization of the client device, etc.). Additionally or alternatively, the language engine 110 can identify a subset of candidate second languages. For example, the language engine 110 can be used to identify a subset of candidate second languages in accordance with process 600 described herein with respect to FIG. 6. Additionally or alternatively, language engine 110 can process audio data using one or more langID models 116 to identify a language spoken in speech captured in the audio data. In some implementations, speech recognition engine 112 can be used to process audio data (e.g., audio data captured via one or more microphones 104 of the client device 102). For example, speech recognition engine 112 can process audio data using one or more ASR models 114 to generate a text representation of a spoken utterance captured in the audio data.

Although FIG. 1 is described with respect to a single client device having a single user, it should be understood that is for the sake of example and is not meant to be limiting. For example, one or more additional client devices of a user can also implement the techniques described herein. For instance, the client device 102, the one or more additional client devices, and/or any other computing devices of the user can form an ecosystem of devices that can employ techniques described herein. These additional client devices and/or computing devices may be in communication with the client device 102 (e.g., over one or more network(s)). As another example, a given client device can be utilized by multiple users in a shared setting (e.g., in a household environment, in an enterprise or work environment, in a hospitality environment, etc.).

Figure 2:
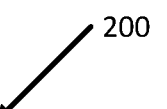
FIG. 2 depicts an example of graphical user interface output rendered based on a subset of candidate second languages, in accordance with various implementations.

FIG. 2 depicts an example 200 of graphical user interface output rendered based on a subset of candidate second languages in accordance with various implementations. In the illustrated example, the graphical user interface output can be rendered via a display of a client device. For example, the output can be rendered via a display 104 of client device 102 described herein.

In the illustrated example 200, the system can render output corresponding to each of the candidate second languages, in the subset of candidate second languages. For example, the graphical user interface output can include a first selectable button 202, a second selectable button 204, and a Nth selectable button 206. The first selectable button 202 can include text in the first candidate second language prompting the second user to select the first candidate second language. The second selectable button 204 can include text in the second candidate second language prompting the second user to select the second candidate second language. Similarly, the Nth selectable button 206 can include text in the Nth candidate second language prompting the second user to select the Nth candidate second language.

In some implementations, in response to rendering the graphical user interface output based on the subset of second candidate languages, the second user can select the selectable button corresponding to a language they speak. In other words, the second user can provide user interface input responsive to the sundered second language output, where the system can process the user interface input provided by the second user to determine a given second language (i.e., the second language for use by the translation application in translating the dialog session between the first user speaking in the first language and the second user speaking in the second language).

Figure 3:
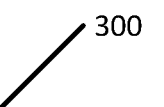
FIG. 3 depicts an additional example of graphical user interface output rendered based on a subset of candidate second languages, in accordance with various implementations.

FIG. 3 illustrates an additional example 300 of graphical user interface output rendered based on a subset of candidate second languages in accordance with various implementations. The example 200 as described herein with respect to FIG. 2 prompts the second user to select one of the selectable buttons in the graphical user interface output. In contrast, example 300 the graphical user interface output includes prompts for the second user to speak utterances in the candidate second languages. The graphical user interface output can include output corresponding to a first candidate second language 302, output corresponding to a second candidate second language 304, and output corresponding to a Nth candidate second language 306.

In the illustrated example 300, the system can render output corresponding to each of the candidate second languages, in the subset of candidate second languages. In some implementations, output corresponding to the first candidate second language 302 can include text in the first candidate second language prompting the second user to speak a first utterance in the first candidate second language. Similarly, output corresponding to the second candidate second language 304 can include text in the second candidate second language prompting the second user to speak a second utterance in the second candidate second language. Additionally or alternatively, output corresponding to the Nth candidate second language 306 can include text in the Nth candidate second language prompting the second user to speak a Nth utterance in the Nth candidate second language.

In some implementations, in response to rendering the graphical user interface output based on the subset of second candidate languages, the second user can speak an utterance corresponding to a language they speak. In other words, audio data capturing the utterance, spoken by the second user, can be captured via one or more microphones of the client device, where the system can process the utterance provided by the second user to determine a given second language (i.e., the second language for use by the translation application in translating the dialog session between the first user speaking in the first language and the second user speaking in the second language).

In some implementations, the system can prompt the second user to say the same phrase in each of the candidate second languages. For example, the system can prompt the second user to speak a first utterance of "I speak this language!" in the first candidate second language, a second utterance of "I speak this language!" in the second candidate second language, and a Nth utterance of "I speak this language!" in the Nth candidate second language.

The system can process the audio data capturing the utterance using one or more language ID (langID) models to identify the language the second user is speaking in the utterance. In some implementations, the system can process the audio data capturing the utterance spoken by the second user using a langID model which corresponds to each of the candidate second languages. For example, the system can process the audio data using a langID model which can identify the first candidate second language, the second candidate second language, the Nth candidate second language, and/or one or more additional or alternative languages (i.e., languages which are not candidate second languages). The system can identify the given second language spoken by the second user based on the output generated using the langID model. Additionally or alternatively, the system can process the audio data using a first langID model corresponding to the first candidate second language, a second langID model corresponding to the second candidate second language, and a Nth langID model corresponding to the Nth candidate second language. The system can identify the given second language spoken by the second user based on comparing the output generated using each of the langID models.

Additionally or alternatively, the system can prompt the second user to say different phrases in each of the candidate second languages. For example, the system can prompt the second user to speak a first utterance of "Apples are delicious to eat" in the first candidate second language, a second utterance of "You should wear a bike helmet for safety" in the second candidate language, and a Nth utterance of "I love cats" in the Nth candidate second language.

In some implementations, the system can process the audio data using one or more automatic speech recognition (ASR) models to generate a text representation of the utterance spoken by the second user. In some implementations, the system can compare each of the phrases prompted by the system (e.g., the first phrase in the first candidate second language, the second phrase in the second candidate second language, the phrase in the Nth candidate second language, etc.) with the generated text representation of the utterance spoken by the second user. The system can identify the given second language based on comparing the generated text representation of the utterance with each of the phrases prompted by the system.

For example, the system can process audio data capturing the utterance of "You should wear a bike helmet for safety" (i.e., the second utterance in the second candidate language using a first ASR model to generate a first text representation of the utterance in the first candidate second language; using a second ASR model to generate a second text representation in the second candidate second language; and a Nth ASR model to generate a Nth text representation in a Nth candidate second language. The system can compare the generated text representations (e.g., the first text representation of the utterance in the first candidate second language, the second text representation of the utterance in the second candidate second language, and the Nth text representation of the utterance in the Nth candidate second language) with the prompts that were rendered to the user (e.g., prompts to say "Apples are delicious to eat" in the first candidate second language, "You should wear a bike helmet for safety" in the second candidate language, and "I love cats" in the Nth candidate second language). In some implementations, the system can select the second language from the subset of candidate second languages based on comparing. For example, the system can determine a second text representation in the second candidate second language of "You should wear a bike helmet for safety" matches the prompt corresponding to the second candidate second language. In some implementations, the system can determine the user speaks the second candidate second language based on the matching.

ASR models corresponding to similar languages may generate similar text representations of utterances spoken in the similar language. For example, processing the audio data using the first ASR model can generate the text representation of "You should wear a bike helmet for safety", which is the same as the text representation generated by processing the audio data using the second ASR model. However, the prompt corresponding to the first candidate second language of "Apples are delicious to eat" does not match the text "You should wear a bike helmet for safety". In some implementations, the system does not select the first candidate second language because the prompted phrase of "Apples are delicious to eat" does not match the text generated using the first ASR model "You should wear a bike helmet for safety".

Similarly, the system selects the second candidate second language because the text generated using the second ASR model of "You should wear a bike helmet for safety" matches the prompt for the second candidate second language of "You should wear a bike helmet for safety".

Figure 4:
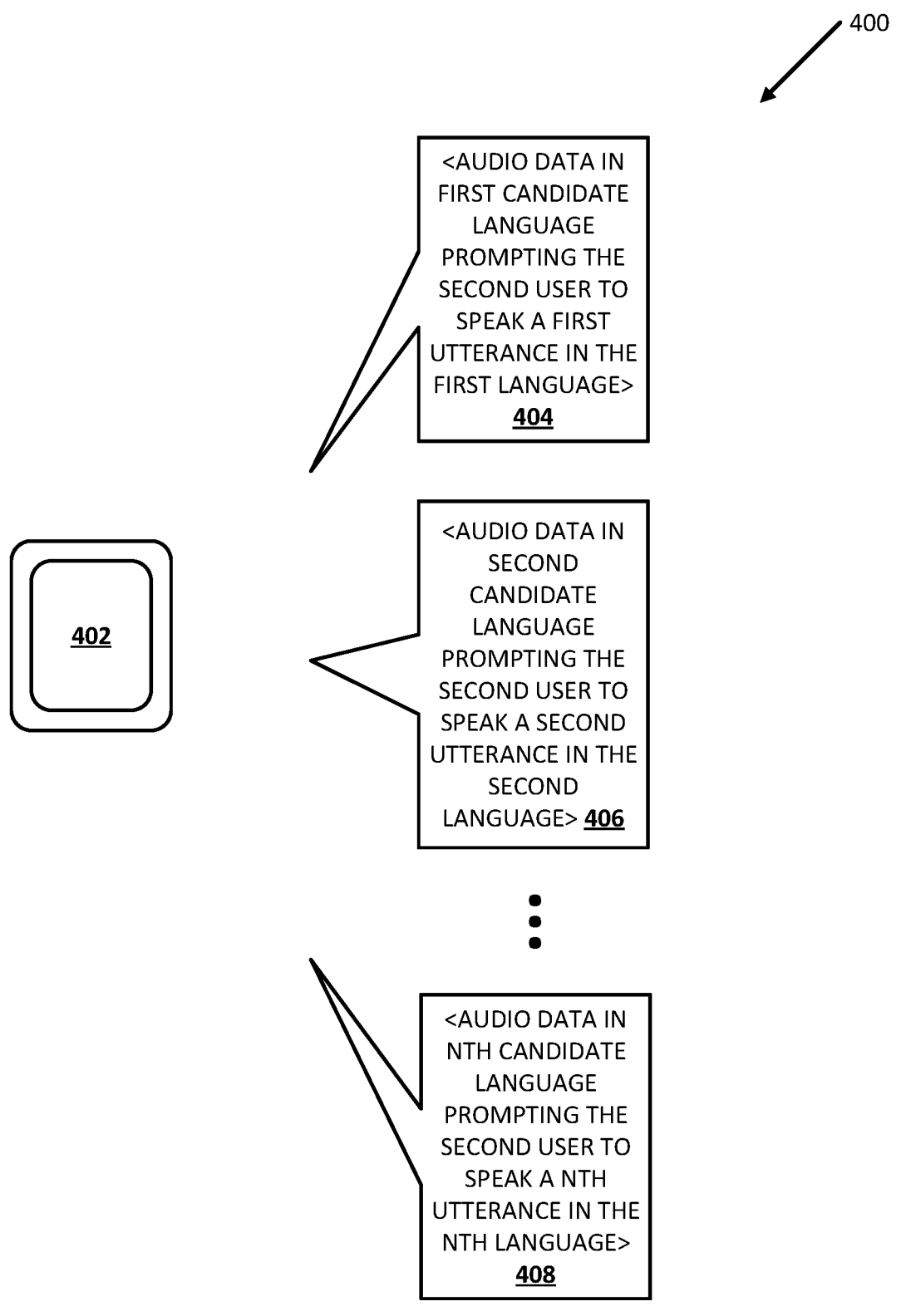
FIG. 4 depicts an example of audio output rendered based on a subset of candidate second languages, in accordance with various implementations.

FIG. 4 depicts an example 400 of audio data based user interface output rendered based on a subset of candidate second languages in accordance with various implementations. In the illustrated example, the client device 402 can render audio data corresponding to each of the candidate second languages. For example, the client device can render: audio data 404, in the first candidate second language, prompting the second user to speak a first utterance in the first candidate second language; audio data 406, in the second candidate second language, prompting the second user to speak a second utterance in the second candidate second language; and audio data 408 in the Nth candidate second language, prompting the second user to speak a Nth utterance in the Nth candidate second language.

FIG. 5 is a flowchart illustrating an example process of 500 of initiating a translation application to translate a dialog session between a first user speaking a first language and a second user speaking a second language in accordance with various implementations disclosed herein. For convenience, the operations of the flowchart are described with reference to a system that performs the operations. This system may include various components of various computer systems, such as one or more components of client device 102, client device 402, client device 702, and/or computing system 810. Moreover, while operations of process 500 are shown in a particular order, this is not meant to be limiting. One or more operations may be reordered, omitted, and/or added.

At block 502, the system initiates, at a client device of a first user, a translation application to translate a dialog session between the first user speaking a first language and a second user speaking a second language. In some implementations, the client device can be client device 102 described herein with respect to FIG. 1 and/or additional or alternative client device(s) described herein. For example, Katherine can initiate a translation application via her laptop to translate a dialog session with Gavin, where Katherine is speaking in English (i.e., the first language) and Gavin is speaking a second language (where the second language spoken by Gavin is not English).

At block 504, the system identifies the first language of the first user. In some implementations, the system can identify the first language of the first user based on one or more features of the client device. For example, the system can determine the first language based on identifying the default language of Katherine's laptop, set while the device was initially being set up. Additionally or alternatively, the first language can be determined based on a language of a user profile associated with the client device and/or the first user (e.g., a language of a user profile for Katherine and/or the laptop). In some implementations, the system can identify the first language of the first user using language engine 110 as described herein with respect to FIG. 1.

At block 506, the system selects a subset of candidate second languages from a plurality of languages. In some implementations, the system can select the subset of candidate second languages in accordance with process 600 of FIG. 6 described herein. For example, the system can select the subset of candidate second languages of Spanish, Cantonese, and Italian.

At block 508, the system renders second language output, via the client device, based on the subset of candidate second languages. In some implementations, the system can render graphical output via one or more displays of the client device. Additionally or alternatively, the system can render audio output via one or more speakers of the client device. For example, the system can render graphical output including text in Spanish, text in Cantonese, and text in Italian. Additionally or alternatively, the system can render audio output of synthetic speech of text in Spanish, text in Cantonese, and text in Italian.

In some implementations, for each candidate second language, the system can render text output in the candidate second language prompting the second user to select the language they speak. The system can prompt the second user to select the language they speak in a variety of ways including selecting a selectable button, saying a particular phrase in the candidate language, performing a particular gesture, one or more additional or alternative methods of selection, and/or combinations thereof. Additionally or alternatively, for each candidate second language, the system can render audio output prompting the second user to select the language they speak. For example, the system can generate audio data which includes synthetic speech in each of the candidate second languages, where the audio data prompts the second user to select the language they speak. For example, Gavin can At block 510, the system receives user interface input responsive to the rendered second language output, where the user interface input indicates a given candidate second language from the subset of candidate second languages. The user interface input can include physical input (e.g., the second user selecting a selectable button), gesture based input (e.g., the second user performing a gesture), audio based input (e.g., the second user speaking a phrase), one or more additional or alternative types on input, and/or combinations thereof.

At block 512, the system determines, based on the user interface input, the given second language from the subset of candidate second languages.

At block 514, the system causes the translation application to perform one or more actions based on the given second language. For example, the translation application can render output (graphical output and/or audio data) indicating the selection of the given second language.

FIG. 6 is a flowchart illustrating an example process of 600 of selecting a subset of candidate second languages from a plurality of languages in accordance with various implementations disclosed herein. For convenience, the operations of the flowchart are described with reference to a system that performs the operations. This system may include various components of various computer systems, such as one or more components of client device 102, client device 402, client device 702, and/or computing system 810. Moreover, while operations of process 600 are shown in a particular order, this is not meant to be limiting. One or more operations may be reordered, omitted, and/or added.

At block 602, the system optionally processes sensor data captured via one or more sensors of the client device. In some implementations, the sensor data can be captured via a variety of sensors of the client device including one or more positioning sensor(s) such as global navigation sensor(s) (e.g., GPS sensor(s), GLONASS sensor(s), Beidou sensor(s), Galileo senor(s), etc.), WiFi positioning sensor(s), one or more additional or alternative positioning sensors, and/or combinations thereof. In some implementations, the location of the client device can be determined based on processing the sensor data.

At block 604, the system determines a location of a dialog session between a first user speaking a first language and a second user speaking a second language. In some implementations, the system can determine the location of the dialog session based on sensor data captured at block 602. In some implementations, the system can determine the location based on a user profile corresponding to the first user. For example, the system can identify the location of the dialog session based on an email confirming hotel reservation made by the first user, an email confirming car rental reservation by the first user, a digital boarding pass of the first user stored on the client device, a calendar entry in a calendar corresponding to the first user indicating a location, one or more additional or alternative items of content corresponding to the first user, and/or combinations thereof.

At block 606, the system selects a subset of candidate second languages from a plurality of languages, where the subset of candidate second languages are selected based on the location of the dialog session. In some implementations, system can select the top N languages spoken in the location (e.g., the top 3 languages, the top 5 languages, etc.). Additionally or alternatively, the system can select languages spoken in the location by at least a threshold number of speakers (e.g., languages spoken by at least 10% of people in the location, by at least 20% of people in the location, by at least 30% of people in the location, by at least 1,000 people in the location, by at least 10,000 people in the location, by at least 1000,000 people in the location, by at least one or more additional or alternative threshold numbers of people, and/or combinations thereof).

Figure 7:
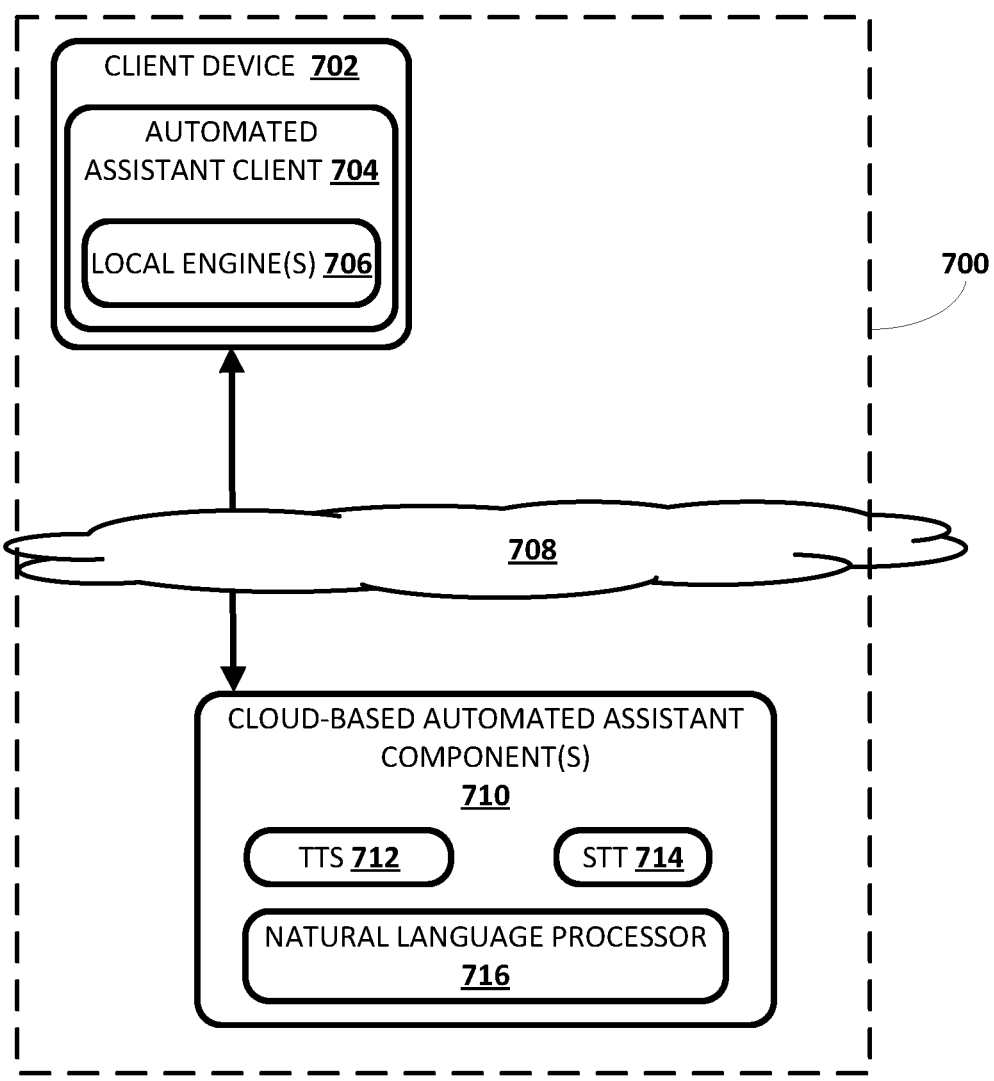
FIG. 7 depicts a block diagram of an additional example environment in which implementations disclosed herein can be implemented.

Turning now to FIG. 7, an example environment is illustrated where various implementations can be performed. FIG. 7 is described initially, and includes a client computing device 702, which executes an instance of an automated assistant client 704. One or more cloud-based automated assistant components 710 can be implemented on one or more computing systems (collectively referred to as a "cloud" computing system) that are communicatively coupled to client device 702 via one or more local and/or wide area networks (e.g., the Internet) indicated generally at 708.

An instance of an automated assistant client 704, by way of its interactions with one or more cloud-based automated assistant components 710, may form what appears to be, from the user's perspective, a logical instance of an automated assistant 700 with which the user may engage in a human-to-computer dialog. An instance of such an automated assistant 700 is depicted in FIG. 7. It thus should be understood that in some implementations, a user that engages with an automated assistant client 704 executing on client device 702 may, in effect, engage with his or her own logical instance of an automated assistant 700. For the sakes of brevity and simplicity, the term "automated assistant" as used herein as "serving" a particular user will often refer to the combination of an automated assistant client 704 executing on a client device 702 operated by the user and one or more cloud-based automated assistant components 710 (which may be shared amongst multiple automated assistant clients of multiple client computing devices). It should also be understood that in some implementations, automated assistant 700 may respond to a request from any user regardless of whether the user is actually "served" by that particular instance of automated assistant 700.

The client computing device 702 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 702 may optionally operate one or more other applications that are in addition to automated assistant client 704, such as a message exchange client (e.g., SMS, MMS, online chat), a browser, and so forth. In some of those various implementations, one or more of the other applications can optionally interface (e.g., via an application programming interface) with the automated assistant 700, or include their own instance of an automated assistant application (that may also interface with the cloud-based automated assistant component(s) 710).

Automated assistant 700 engages in human-to-computer dialog sessions with a user via user interface input and output devices of the client device 702. To preserve user privacy and/or to conserve resources, in many situations a user must often explicitly invoke the automated assistant 700 before the automated assistant will fully process a spoken utterance. The explicit invocation of the automated assistant 700 can occur in response to certain user interface input received at the client device 702. For example, user interface inputs that can invoke the automated assistant 700 via the client device 702 can optionally include actuations of a hardware and/or virtual button of the client device 702. Moreover, the automated assistant client can include one or more local engines 706, such as an invocation engine that is operable to detect the presence of one or more spoken invocation phrases. The invocation engine can invoke the automated assistant 700 in response to detection of one of the spoken invocation phrases. For example, the invocation engine can invoke the automated assistant 700 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 702, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 700. As used herein, "invoking" the automated assistant 700 can include causing one or more previously inactive functions of the automated assistant 700 to be activated. For example, invoking the automated assistant 700 can include causing one or more local engines 706 and/or cloud-based automated assistant components 710 to further process audio data frames based on which the invocation phrase was detected, and/or one or more following audio data frames (whereas prior to invoking no further processing of audio data frames was occurring). For instance, local and/or cloud-based components can process captured audio data using a two-pass ASR model in response to invocation of the automated assistant 700.

The one or more local engine(s) 706 of automated assistant 700 are optional, and can include, for example, the invocation engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 702 is relatively constrained in terms of computing resources (e.g., processor cycles, memory, battery, etc.), the local engines 706 may have limited functionality relative to any counterparts that are included in cloud-based automated assistant components 710.

Cloud-based automated assistant components 710 leverage the virtually limitless resources of the cloud to perform more robust and/or more accurate processing of audio data, and/or other user interface input, relative to any counterparts of the local engine(s) 706. Again, in various implementations, the client device 702 can provide audio data and/or other data to the cloud-based automated assistant components 710 in response to the invocation engine detecting a spoken invocation phrase, or detecting some other explicit invocation of the automated assistant 700.

The illustrated cloud-based automated assistant components 710 include a cloud-based TTS module 712, a cloud-based STT module 714, a natural language processor 716, a dialog state tracker 718, and a dialog manager 720. In some implementations, one or more of the engines and/or modules of automated assistant 700 may be omitted, combined, and/or implemented in a component that is separate from automated assistant 700. Further, in some implementations automated assistant 700 can include additional and/or alternative engines and/or modules. Cloud-based STT module 714 can convert audio data into text, which may then be provided to natural language processor 716.

Cloud-based TTS module 712 can convert textual data (e.g., natural language responses formulated by automated assistant 700) into computer-generated speech output. In some implementations, TTS module 712 may provide the computer-generated speech output to client device 702 to be output directly, e.g., using one or more speakers. In other implementations, textual data (e.g., natural language responses) generated by automated assistant 700 may be provided to one of the local engine(s) 706, which may then convert the textual data into computer-generated speech that is output locally.

Natural language processor 716 of automated assistant 700 processes free form natural language input and generates, based on the natural language input, annotated output for use by one or more other components of the automated assistant 700. For example, the natural language processor 716 can process natural language free-form input that is textual input that is a conversion, by STT module 714, of audio data provided by a user via client device 702. The generated annotated output may include one or more annotations of the natural language input and optionally one or more (e.g., all) of the terms of the natural language input.

In some implementations, the natural language processor 716 is configured to identify and annotate various types of grammatical information in natural language input. In some implementations, the natural language processor 716 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 716 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 716 may rely on annotations from one or more other components of the natural language processor 716. In some implementations, in processing a particular natural language input, one or more components of the natural language processor 716 may use related prior input and/or other related data outside of the particular natural language input to determine one or more annotations.

Figure 8:
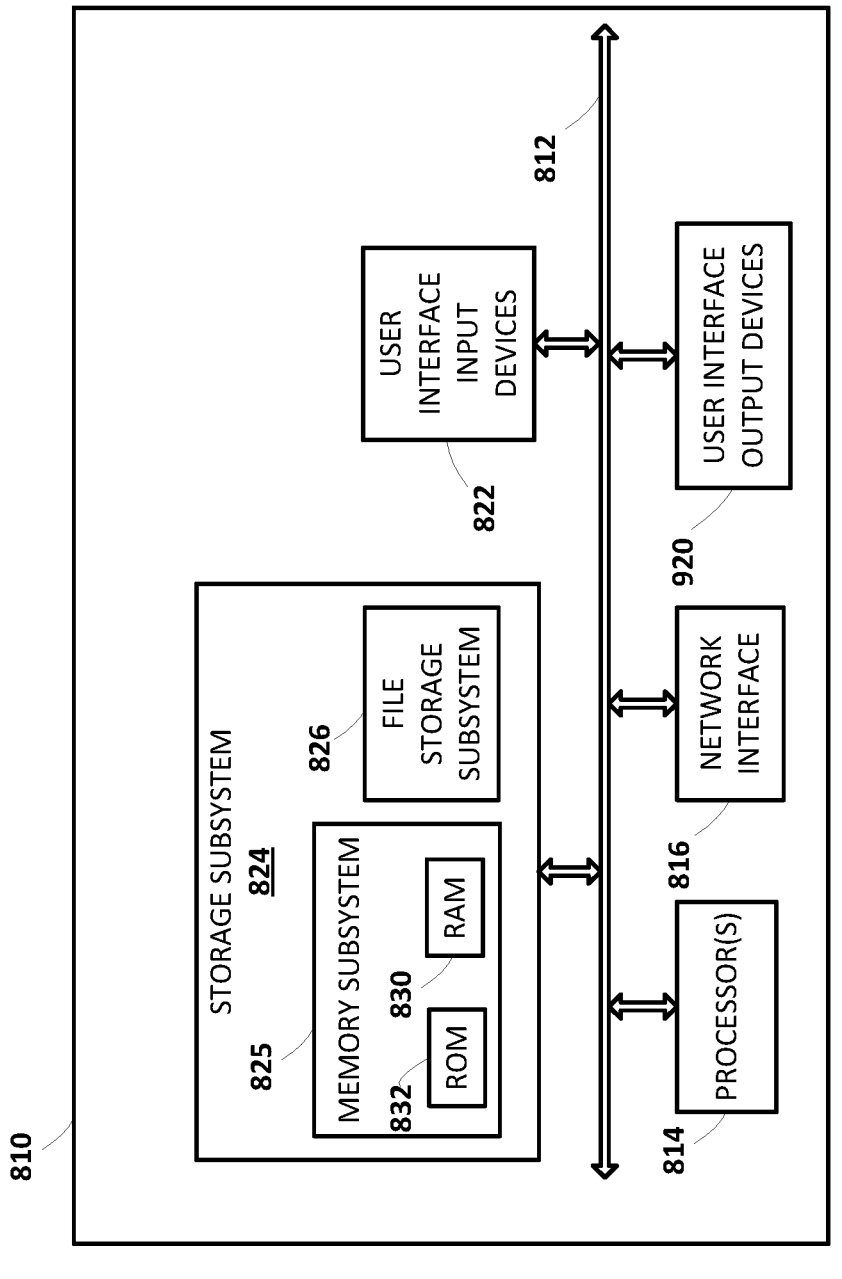
FIG. 8 depicts an example architecture of a computing device, in accordance with various implementations.

FIG. 8 is a block diagram of an example computing device 810 that may optionally be utilized to perform one or more aspects of techniques described herein. In some implementations, one or more of a client computing device, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the process of FIG. 5 and/or FIG. 6, as well as to implement various components depicted in FIG. 1 and/or FIG. 7.

These software modules are generally executed by processor 814 alone or in combination with other processors. Memory 825 used in the storage subsystem 824 can include a number of memories including a main random access memory ("RAM") 830 for storage of instructions and data during program execution and a read only memory ("ROM") 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method includes initiating, at a client device of a first user, a translation application to translate a dialog session between the first user speaking a first language and a second user speaking a second language, wherein the first language is distinct from the second language. In some implementations, the method further includes identifying the first language of the first user. In some implementations, the method further includes selecting a subset of candidate second languages from a plurality of languages. In some implementations, the method further includes rendering second language output, via the client device, based on the subset of candidate second languages. In some implementations, the method further includes receiving user interface input responsive to the rendered second language output, wherein the user interface input indicates a given candidate second language from the subset of candidate second languages. In some implementations, the method further includes determining, based on the user interface input, the given second language from the subset of candidate second languages.

These and other implementations of technology disclosed herein can optionally include one or more of the following features.

In some implementations, rendering the second language output via the client device, based on the subset of candidate second languages includes rendering graphical output based on the subset of candidate second languages, wherein at least a portion of the graphical output corresponds to each candidate second language in the subset of candidate second languages. In some versions of those implementations, for each candidate second language, in the subset of candidate second languages, rendering the graphical output based on the subset of candidate second languages includes rendering, via at least a display of the client device, graphical output in the candidate second language prompting the second user to provide an indication of whether the second user can speak the candidate second language. In some versions of those implementations, the graphical output in the second language is a selectable button, and wherein the indication of whether the second user can speak the candidate second language comprises the second user pressing the selectable button. In some versions of those implementations, the indication of whether the second user can speak the candidate second language comprises user interface input provided to the client device, wherein the user interface input captures one or more gestures of the second user. In some versions of those implementations, the indication of whether the second user can speak the candidate second language comprises user interface input provided to the client device, wherein the user interface input captures an utterance spoken by the second user.

In some implementations, identifying the first language of the first user includes determining a language associated with the client device. In some implementations, the method further includes identifying the first language based on the determined language associated with the client device.

In some implementations, selecting the subset of candidate second languages from the plurality of languages includes determining a location of the dialog session between the first user speaking the first language and the second user speaking the second language. In some implementations, the method further includes selecting the subset of candidate second languages based on the location of the dialog session. In some versions of those implementations, determining the location of the dialog session between the first user speaking the first language and the second user speaking the second language includes processing sensor data captured at one or more positioning sensors of the client device. In some implementations, the method further includes determining the location of the dialog session based on the sensor data captured at the one or more sensors of the client device. In some versions of those implementations, the one or more sensors of the client device include one or more global navigation positioning sensors. In some versions of those implementations, the one or more sensors of the client device are one more WiFi positioning sensors.

In some implementations, selecting the subset of candidate second languages based on the location of the dialog session includes identifying one or more languages spoken at the location. In some implementations, the method further includes selecting the subset of candidate second languages based on the one or more languages spoken at the location. In some versions of those implementations, for each of the one or more languages spoken at the location, and until one or more conditions are satisfied, selecting the subset of candidate second languages based on the one or more languages spoken at the location includes selecting a given language of the one or more languages spoken at the location. In some implementations, the method further includes determining a value indicating a number of people in the location who speak the given language. In some implementations, the method further includes determining whether the value satisfies a threshold. In some implementations, in response to determining the value satisfies the threshold, the method further includes including the given language in the subset of candidate second languages. In some versions of those implementations, selecting the subset of candidate second languages based on the one or more languages spoken at the location includes selecting a threshold number of the languages spoken at the location. In some implementations, the method further includes selecting the subset of candidate second languages based on the threshold number of the languages spoken at location.

In some implementations, selecting the subset of candidate second languages from the plurality of languages includes determining one or more location features based on a user profile associated with the first user. In some implementations, the method further includes selecting the subset of candidate second languages based on the one or more location features.

In some implementations, rendering the second language output via the client device, based on the subset of candidate second languages includes rendering audio output based on the subset of candidate second languages, wherein at least a portion of the audio output corresponds to each candidate second language in the subset of candidate second languages. In some versions of those implementations, for each candidate second language, in the subset of candidate second languages, rendering the audio output based on the subset of candidate second languages includes rendering, via one or more speakers of the client device, second language audio output, in the second language, prompting the second user to provide an indication whether the second user can speak the candidate second language. In some versions of those implementations, the indication of whether the second user can speak the candidate second language includes user interface input provided to the client device, wherein the user interface input captures one or more gestures of the second user. In some versions of those implementations, the indication of whether the second user can speak the candidate second language comprises user interface input provided to the client device, wherein the user interface input captures an utterance spoken by the second user.

In some implementations, the user interface input, responsive to the rendered second language output, indicating the given candidate second language from the subset of candidate languages includes audio data capturing an utterance spoken by the second user in the second language, and wherein identifying the given second language from the subset of candidate second languages based on the user interface input includes identifying a language identification (langID) model corresponding to each of the candidate second languages in the subset of candidate second languages. In some implementations, the method further includes processing the audio data capturing the utterance spoken by the second user in the second language using the langID model to generate language identification output. In some implementations, the method further includes identifying the given second language based on the language identification output.

In some implementations, the user interface input, responsive to the rendered second language output, for each candidate second language in the subset of candidate second languages, indicating the given candidate second language from the subset of candidate languages includes audio data capturing an utterance spoken by the second user in the second language, and wherein identifying the given second language from the subset of candidate second languages includes identifying a langID model corresponding to the candidate second language. In some implementations, the method further includes processing the audio data capturing the utterance spoken by the second user using the langID model to generate language identification output corresponding to the candidate second language. In some implementations, the method further includes identifying the given second language based on the language identification output corresponding to each of the second languages.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more computer readable storage media (e.g., transitory or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
 initiating, at a client device of a first user, a translation application to translate a dialog session between the first user speaking a first language and a second user speaking a second language, wherein the first language is distinct from the second language;
 identifying the first language of the first user;
 selecting a subset of candidate second languages from a plurality of languages, wherein the subset of candidate second languages includes at least two candidate second languages;
 outputting a plurality of second language outputs, via the client device, based on the subset of candidate second languages, wherein a first output of the second language outputs is rendered in one of the subset of candidate second languages, and a second output of the second language outputs is rendered in a different one of the subset of candidate second languages;
 receiving user interface input responsive to the second language outputs, wherein the user interface input indicates a given candidate second language from the subset of candidate second languages; and
 determining, based on the user interface input, the given second language from the subset of candidate second languages.

2. The method of claim 1, wherein outputting the plurality of second language outputs, via the client device, based on the subset of candidate second languages comprises:
 rendering graphical outputs based on the subset of candidate second languages, wherein at least a portion of the graphical outputs correspond to each candidate second language in the subset of candidate second languages.

3. The method of claim 2, wherein rendering the graphical outputs based on the subset of candidate second languages comprises:
 for each candidate second language, in the subset of candidate second languages:
  rendering, via at least a display of the client device, graphical output in the candidate second language prompting the second user to provide an indication of whether the second user can speak the candidate second language.

4. The method of claim 3, wherein the graphical output in the candidate second language is a selectable button, and wherein the indication of whether the second user can speak the candidate second language comprises the second user pressing the selectable button.

5. The method of claim 3, wherein the indication of whether the second user can speak the candidate second language comprises user interface input provided to the client device, wherein the user interface input captures one or more gestures of the second user.

6. The method of claim 3, wherein the indication of whether the second user can speak the candidate second language comprises user interface input provided to the client device, wherein the user interface input captures an utterance spoken by the second user.

7. The method of claim 1, wherein identifying the first language of the first user comprises:

determining a language associated with the client device; and identifying the first language based on the determined language associated with the client device.

8. The method of claim 1, wherein selecting the subset of candidate second languages from the plurality of languages comprises:

determining a location of the dialog session between the first user speaking the first language and the second user speaking the second language; and selecting the subset of candidate second languages based on the location of the dialog session.

9. The method of claim 8, wherein determining the location of the dialog session between the first user speaking the first language and the second user speaking the second language comprises:

processing sensor data captured at one or more positioning sensors of the client device; and determining the location of the dialog session based on the sensor data captured at the one or more sensors of the client device.

10. The method of claim 9, wherein the one or more sensors of the client device include one or more global navigation positioning sensors.

11. The method of claim 9, wherein the one or more sensors of the client device are one or more WiFi positioning sensors.

12. The method of claim 8, wherein selecting the subset of candidate second languages based on the location of the dialog session comprises:

identifying one or more languages spoken at the location; and selecting the subset of candidate second languages based on the one or more languages spoken at the location.

13. The method of claim 12, wherein selecting the subset of candidate second languages based on the one or more languages spoken at the location comprises:

for each of the one or more languages spoken at the location:

selecting a given language of the one or more languages spoken at the location;

determining a value indicating a number of people in the location who speak the given language;

determining whether the value satisfies a threshold; and in response to determining the value satisfies the threshold, including the given language in the subset of candidate second languages.

14. The method of claim 12, wherein selecting the subset of candidate second languages based on the one or more languages spoken at the location comprises:

selecting a threshold number of the languages spoken at the location; and selecting the subset of candidate second languages based on the threshold number of the languages spoken at the location.

15. The method of claim 1, wherein selecting the subset of candidate second languages from the plurality of languages comprises:

determining one or more location features based on a user profile associated with the first user; and selecting the subset of candidate second languages based on the one or more location features.

16. The method of claim 1, wherein outputting the plurality of second language outputs, via the client device, based on the subset of candidate second languages comprises:

rendering audio output based on the subset of candidate second languages, wherein at least a portion of the audio output corresponds to each candidate second language in the subset of candidate second languages.

17. The method of claim 16, wherein rendering the audio output based on the subset of candidate second languages comprises:

for each candidate second language, in the subset of candidate second languages:

rendering, via one or more speakers of the client device, second language audio output, in the second language, prompting the second user to provide an indication whether the second user can speak the candidate second language.

18. The method of claim 17, wherein the indication of whether the second user can speak the candidate second language comprises user interface input provided to the client device, wherein the user interface input captures one or more gestures of the second user.

19. The method of claim 17, wherein the indication of whether the second user can speak the candidate second language comprises user interface input provided to the client device, wherein the user interface input captures an utterance spoken by the second user.

20. The method of claim 1, wherein the user interface input, responsive to the rendered second language output, indicating the given candidate second language from the subset of candidate second languages includes audio data capturing an utterance spoken by the second user in the second language, and wherein determining the given second language from the subset of candidate second languages based on the user interface input comprises:

identifying a language identification (langID) model corresponding to each of the candidate second languages in the subset of candidate second languages;

processing the audio data capturing the utterance spoken by the second user in the second language using the langID model to generate language identification output; and identifying the given second language based on the language identification output.

21. The method of claim 1, wherein the user interface input responsive to the second language outputs includes audio data capturing an utterance spoken by the second user in the second language, and wherein identifying the given second language from the subset of candidate second languages comprises:

for each candidate second language in the subset of candidate second languages:

identifying a language identification (langID) model corresponding to the candidate second language;

processing the audio data capturing the utterance spoken by the second user using the langID model to generate language identification output correspond-
ing to the candidate second language; and identifying the given second language based on the lan-
guage identification output corresponding to each of the
candidate second languages.

* * * * *